US006578392B1

(12) United States Patent
Bowman et al.

(10) Patent No.: US 6,578,392 B1
(45) Date of Patent: Jun. 17, 2003

(54) HITCH LOCK

(76) Inventors: Victor Bowman, 4695 Brayton Mt Rd., Graysville, TN (US) 37338; Howard Bowman, 4695 Brayton Mt Rd., Graysville, TN (US) 37338

( * ) Notice: Subject to any disclaimer, the term of this patent is extended or adjusted under 35 U.S.C. 154(b) by 0 days.

(21) Appl. No.: 10/056,541

(22) Filed: Jan. 25, 2002

(51) Int. Cl.7 .............................................. E05B 73/00
(52) U.S. Cl. ................................ 70/14; 280/507; 70/58
(58) Field of Search ............................ 70/14, 58, 258; 280/507

(56) References Cited

U.S. PATENT DOCUMENTS

| | | | |
|---|---|---|---|
| 3,844,143 A | | 10/1974 | Hudson |
| 4,186,575 A | | 2/1980 | Bulle |
| 4,376,544 A | * | 3/1983 | Sette et al. ................ 280/507 |
| 4,380,160 A | * | 4/1983 | Hoffman ...................... 70/14 |
| 4,440,005 A | | 4/1984 | Bulle |
| 4,480,450 A | * | 11/1984 | Brown .......................... 70/14 |
| D312,958 S | | 12/1990 | Aguilar |
| 5,332,251 A | * | 7/1994 | Farquhar ................... 280/507 |
| 5,343,720 A | | 9/1994 | Slater |
| 5,873,271 A | * | 2/1999 | Smith ........................ 280/507 |
| 5,937,679 A | | 8/1999 | Villalon |
| 6,467,317 B1 | * | 10/2002 | Hillabush et al. ............. 70/56 |

* cited by examiner

Primary Examiner—Anthony Knight
Assistant Examiner—John B. Walsh

(57) ABSTRACT

A hitch lock for inhibiting the theft of a trailer. The hitch lock includes a base member having a base plate. The base plate is designed for abutting a bottom of the trailer hitch. The base member has a rod portion. The rod portion is coupled to the base plate whereby the rod portion extends through an aperture of the trailer hitch. A top plate has a receiving bore. The receiving bore slidably receives the rod portion of the base member. The top plate is designed for abutting a top of the trailer hitch when the receiving bore receives the rod portion of the base member and the base plate abuts the bottom of the trailer hitch. A locking member is selectively couplable to the rod portion of the base member for securing the top plate to the base member.

3 Claims, 3 Drawing Sheets

HITCH LOCK

BACKGROUND OF THE INVENTION

1. Field of the Invention

The present invention relates to trailer hitch locks and more particularly pertains to a new hitch lock for inhibiting the theft of a trailer.

2. Description of the Prior Art

The use of trailer hitch locks is known in the prior art. U.S. Pat. No. 5,937,679 describes a device for preventing access to a trailer coupler to prevent a thief from hooking the trailer coupler up to be towed away. Another type of trailer hitch lock is U.S. Pat. No. 5,343,720 having a loss-prevention device that extends through a hole of a lunette eye to prevent access to the hole of the lunette eye by a thief. U.S. Pat. No. 3,844,143 has a device reliably applied to the forward towing hook of a trailer type road vehicle to prevent unauthorized access to the forward to hook. U.S. Pat. No. 4,440,005 has a pair of flat circular plates couplable to the ring of a trailer hitch tongue to prevent unauthorized access to the ring of the trailer hitch tongue. U.S. Pat. No. 4,186,575 has a lock apparatus that is secured through the ring of a trailer hitch tongue to prevent unauthorized access to the ring of the trailer hitch tongue. U.S. Pat. No. Des. 312,958 shows a lunette trailer hitch anti-theft device.

SUMMARY OF THE INVENTION

An object of the present invention is to provide a new hitch lock that inhibits access to the aperture of a trailer hitch to inhibit theft of a trailer.

Even still another object of the present invention is to provide a new hitch lock that has no moving parts to wear out after repeated use.

To this end, the present invention generally comprises a base member having a base plate. The base plate is designed for abutting a bottom of the trailer hitch. The base member has a rod portion. The rod portion is coupled to the base plate whereby the rod portion is designed for extending through an aperture of the trailer hitch when the base plate abuts the bottom of the trailer hitch. A top plate has a receiving bore. The receiving bore slidably receives the rod portion of the base member. The top plate is designed for abutting a top of the trailer hitch when the receiving bore receives the rod portion of the base member and the base plate abuts the bottom of the trailer hitch. A locking member is selectively couplable to the rod portion of the base member. The locking member is for securing the top plate to the base member whereby the base member and the top plate are designed for being secured to the trailer hitch to prevent theft of the trailer.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
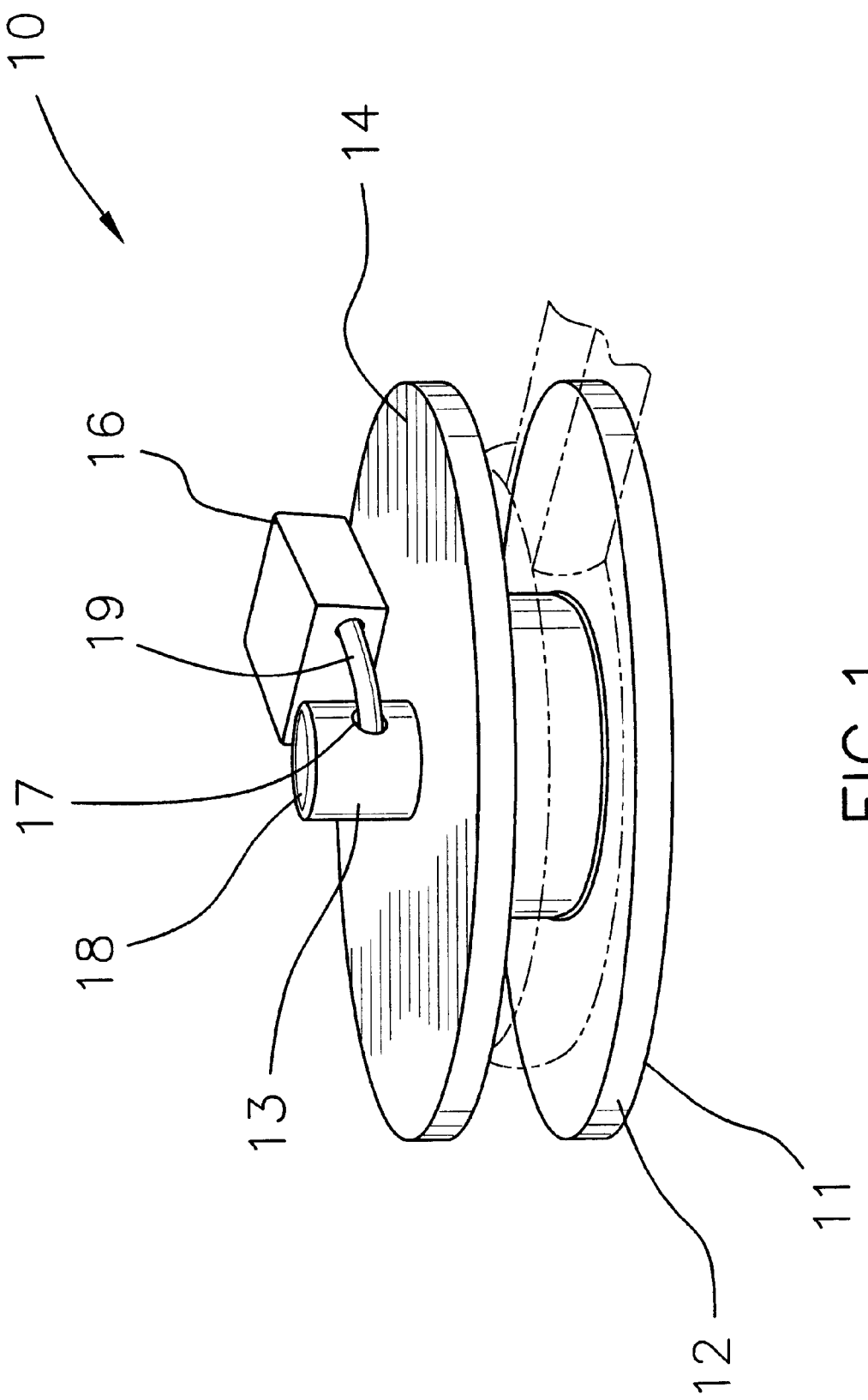
FIG. 1 is a perspective view of a new hitch lock according to the present invention shown in use.
Figure 2:
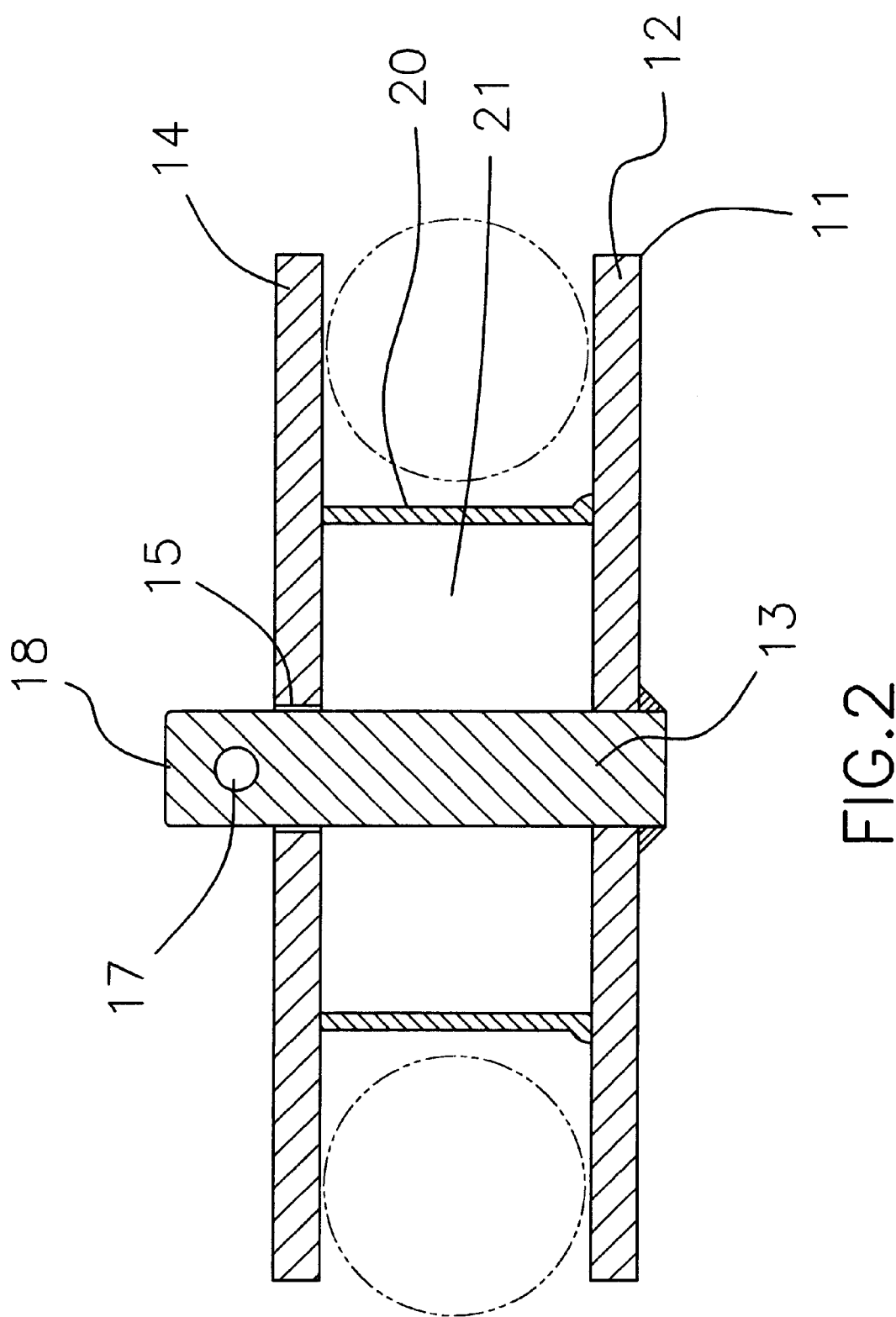
FIG. 2 is a cross-sectional view of the present invention.
Figure 3:
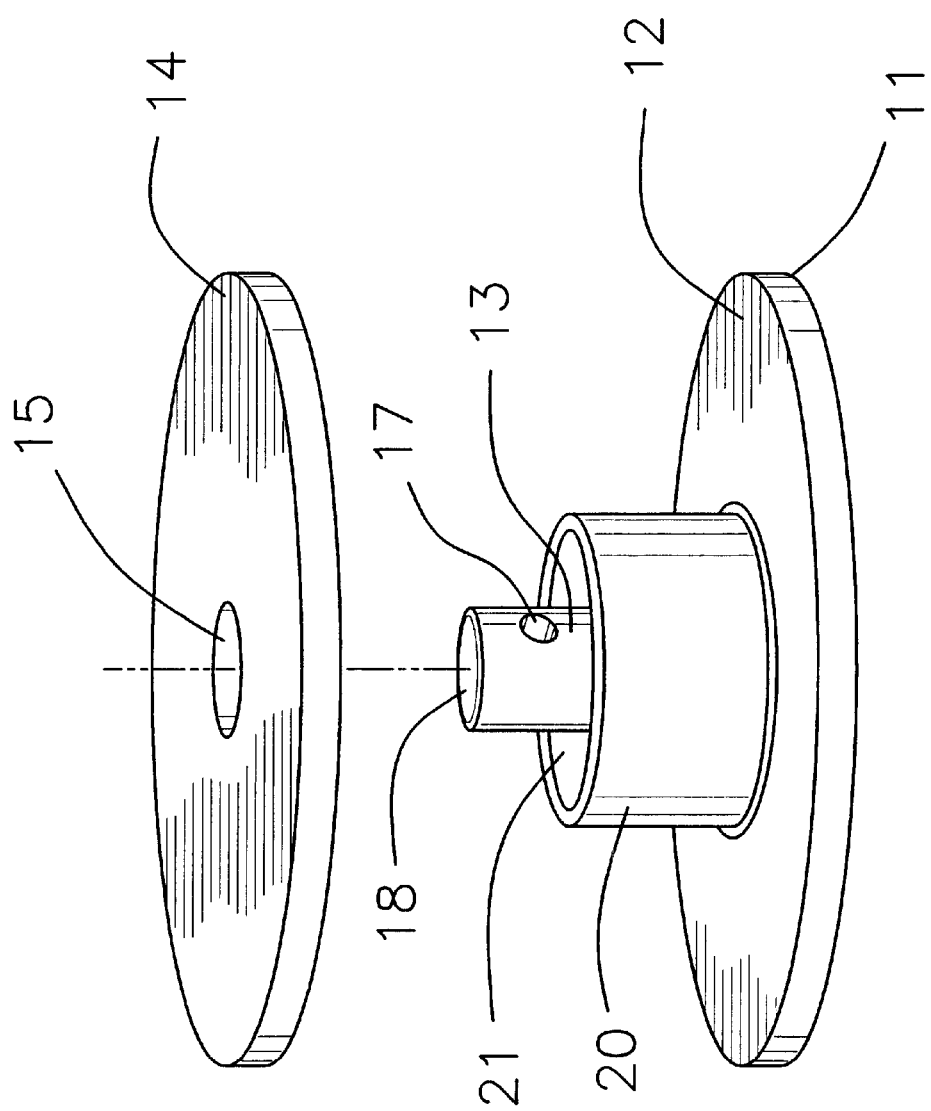
FIG. 3 is an exploded perspective view of the present invention.

With reference now to the drawings, and in particular to FIGS. 1 through 3 thereof, a new hitch lock embodying the principles and concepts of the present invention and generally designated by the reference numeral 10 will be described.

As best illustrated in FIGS. 1 through 3, the hitch lock 10 generally comprises a base member 11 having a base plate 12. The base plate 12 is designed for abutting a bottom of the trailer hitch. The base member 11 has a rod portion 13. The rod portion 13 is coupled to the base plate 12 whereby the rod portion 13 is designed for extending through an aperture of the trailer hitch when the base plate 12 abuts the bottom of the trailer hitch.

A top plate 14 has a receiving bore 15. The receiving bore 15 slidably receives the rod portion 13 of the base member 11. The top plate 14 is designed for abutting a top of the trailer hitch when the receiving bore 15 receives the rod portion 13 of the base member 11 and the base plate 12 abuts the bottom of the trailer hitch.

A locking member 16 is selectively couplable to the rod portion 13 of the base member 11. The locking member 16 is for securing the top plate 14 to the base member 11 whereby the base member 11 and the top plate 14 are designed for being secured to the trailer hitch to prevent theft of the trailer.

The rod portion of the base member 11 has a locking bore 17. The locking bore 17 is positioned proximate a free end 18 of the rod portion 13 whereby the locking bore 17 is positioned between the free end 18 of the rod portion 13 and the top plate 14 when the top plate 14 abuts the top of the trailer hitch. The locking bore 17 receives a locking arm 19 of the locking member 16 for inhibiting removal of the top plate 14 from the rod portion 13 of the base.

The base member 11 has a sleeve portion 20. The sleeve portion 20 is coupled to the base plate 12 of the base member 11 whereby the rod portion 13 of the base member 11 extends through a lumen 21 of the sleeve portion 20. The sleeve portion 20 of the base member 11 is for maintaining the top plate 14 in spaced relationship to the base plate 12 of the base member 11 when the top plate 14 is coupled to the base member 11. The sleeve portion 20 is designed for engaging an interior face of the trailer hitch whereby the base member 11 is inhibited from being repositioned on the trailer hitch when the base member 11 and the top plate 14 are coupled to the trailer hitch thereby preventing access to the aperture of the trailer hitch by a thief.

In use, the user inserts the sleeve portion 20 of the base member 11 into the aperture of trailer hitch so that the base plate 12 abuts the bottom of the trailer hitch. The top plate 14 is then positioned on the base member 11 so that the rod portion 13 of the base member 11 extends through the receiving bore 15 of the top plate 14. The locking member 16, such as a padlock, is the secured to the locking bore 17 of the rod portion 13 of the base member 11 for inhibiting removal of the top member and the base member 11 from the trailer hitch.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A hitch lock for inhibiting access to a trailer hitch of a trailer to prevent the trailer from being stolen, the hitch lock comprising:

a base member having a base plate, said base plate being adapted for abutting a bottom of the trailer hitch, said base member having a rod portion, said rod portion being coupled to said base plate such that said rod portion is adapted for extending through an aperture of the trailer hitch when said base plate abuts the bottom of the trailer hitch;

a top plate having a receiving bore, said receiving bore slidably receiving said rod portion of said base member, said top plate being adapted for abutting a top of the trailer hitch when said receiving bore receives said rod portion of said base member and said base plate abuts the bottom of the trailer hitch;

a locking member being selectively couplable to said rod portion of said base member, said locking member being for securing said top plate to said base member such that said base member and said top plate are adapted for being secured to the trailer hitch to prevent theft of the trailer;

said base member having a sleeve portion, said sleeve portion being coupled to said base plate of said base member such that said rod portion of said base member extends through a lumen of said sleeve portion, said sleeve portion of said base member being for maintaining said top plate in spaced relationship to said base plate of said base member when said top plate is coupled to said base member, said sleeve portion being adapted for engaging an interior face of the trailer hitch such that said base member is inhibited from being repositioned on the trailer hitch when said base member and said top plate are coupled to the trailer hitch; and said rod portion comprising a smooth exterior surface such that said smooth exterior surface facilitates sliding of said rod portion through said receiving bore of said top plate.

2. The hitch lock as set forth in claim 1, further comprising:

said rod portion of said base member having a locking bore, said locking bore being positioned proximate a free end of said rod portion such that said locking bore is positioned between said free end of said rod portion and said top plate when said top plate abuts the top of the trailer hitch, said locking bore receiving a locking arm of said locking member for inhibiting removal of said top plate from said rod portion of said base member.

3. A hitch lock for inhibiting access to a trailer hitch of a trailer to prevent the trailer from being stolen, the hitch lock comprising:

a base member having a base plate, said base plate being adapted for abutting a bottom of the trailer hitch, said base member having a rod portion, said rod portion being coupled to said base plate such that said rod portion is adapted for extending through an aperture of the trailer hitch when said base plate abuts the bottom of the trailer hitch;

a top plate having a receiving bore, said receiving bore slidably receiving said rod portion of said base member, said top plate being adapted for abutting a top of the trailer hitch when said receiving bore receives said rod portion of said base member and said base plate abuts the bottom of the trailer hitch;

a locking member being selectively couplable to said rod portion of said base member, said locking member being for securing said top plate to said base member such that said base member and said top plate are adapted for being secured to the trailer hitch to prevent theft of the trailer;

said rod portion of said base member having a locking bore, said locking bore being positioned proximate a free end of said rod portion such that said locking bore is positioned between said free end of said rod portion and said top plate when said top plate abuts the top of the trailer hitch, said locking bore receiving a locking arm of said locking member for inhibiting removal of said top plate from said rod portion of said base member;

said base member having a sleeve portion, said sleeve portion being coupled to said base plate of said base member such that said rod portion of said base member extends through a lumen of said sleeve portion, said sleeve portion of said base member being for maintaining said top plate in spaced relationship to said base plate of said base member when said top plate is coupled to said base member, said sleeve portion being adapted for engaging an interior face of the trailer hitch such that said base member is inhibited from being repositioned on the trailer hitch when said base member and said top plate are coupled to the trailer hitch; and said rod portion comprising a smooth exterior surface such that said smooth exterior surface facilitates sliding of said rod portion through said receiving bore of said top plate.

* * * * *